US012664296B2

(12) United States Patent (10) Patent No.: US 12,664,296 B2
Verma et al. (45) Date of Patent: Jun. 23, 2026

(54) AUTOMATIC DATA LAYERING

(71) Applicant: Bank of America Corporation,
Charlotte, NC (US)

(72) Inventors: Sanjeev Verma, Harrisburg, NC (US);
Manu Kurian, Dallas, TX (US)

(73) Assignee: Bank of America Corporation,
Charlotte, NC (US)

( * ) Notice: Subject to any disclaimer, the term of this
patent is extended or adjusted under 35
U.S.C. 154(b) by 525 days.

(21) Appl. No.: 18/199,408

(22) Filed: May 19, 2023

(65) Prior Publication Data

US 2024/0386121 A1 Nov. 21, 2024

(51) Int. Cl.
*G06F 21/62* (2013.01)
*G06F 21/60* (2013.01)

(52) U.S. Cl.
CPC ........ *G06F 21/6218* (2013.01); *G06F 21/604*
(2013.01); *G06F 2221/2113* (2013.01)

(58) Field of Classification Search
CPC ............... G06F 21/6218; G06F 21/604; G06F
2221/2113
See application file for complete search history.

(56) References Cited

U.S. PATENT DOCUMENTS

| | | | |
|---|---|---|---|
| 2020/0074091 A1* | 3/2020 | Jain ........................ | H04L 9/0894 |
| 2021/0216657 A1* | 7/2021 | Saad ...................... | G06F 3/0623 |
| 2022/0382902 A1* | 12/2022 | Panikkar ............. | G06F 21/6245 |

* cited by examiner

*Primary Examiner* — Thaddeus J Plecha
(74) *Attorney, Agent, or Firm* — Weiss & Arons LLP

(57) ABSTRACT

Apparatus and methods to automatically layer data are
provided. An automatic data layering program may receive
access to multiple quanta of data. The program may auto-
matically analyze and categorize each quanta of data with a
corresponding level of access. The program may transfer
each quanta of data so that various data stores may each only
have data with the same level of access stored within. The
program may receive a request to access data from a user.
The program may determine the user's level of access and
authorize access to the user to data corresponding with the
user's level of access. The program may create a three-
dimensional map or display of available data.

19 Claims, 6 Drawing Sheets

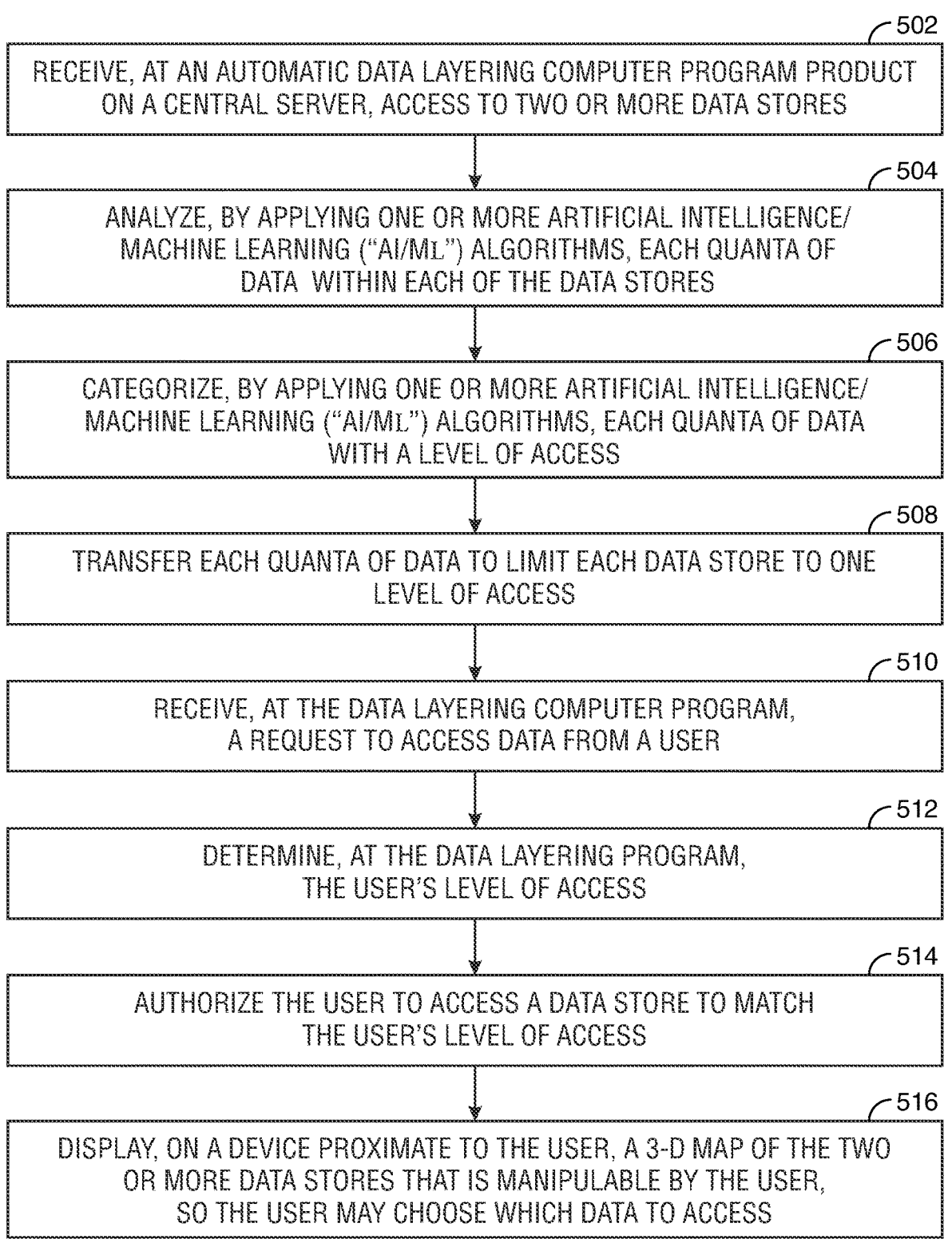

502

RECEIVE, AT AN AUTOMATIC DATA LAYERING COMPUTER PROGRAM PRODUCT ON A CENTRAL SERVER, ACCESS TO TWO OR MORE DATA STORES

504

ANALYZE, BY APPLYING ONE OR MORE ARTIFICIAL INTELLIGENCE/ MACHINE LEARNING ("AI/ML") ALGORITHMS, EACH QUANTA OF DATA WITHIN EACH OF THE DATA STORES

506

CATEGORIZE, BY APPLYING ONE OR MORE ARTIFICIAL INTELLIGENCE/ MACHINE LEARNING ("AI/ML") ALGORITHMS, EACH QUANTA OF DATA WITH A LEVEL OF ACCESS

508

TRANSFER EACH QUANTA OF DATA TO LIMIT EACH DATA STORE TO ONE LEVEL OF ACCESS

510

RECEIVE, AT THE DATA LAYERING COMPUTER PROGRAM, A REQUEST TO ACCESS DATA FROM A USER

512

DETERMINE, AT THE DATA LAYERING PROGRAM, THE USER'S LEVEL OF ACCESS

514

AUTHORIZE THE USER TO ACCESS A DATA STORE TO MATCH THE USER'S LEVEL OF ACCESS

516

DISPLAY, ON A DEVICE PROXIMATE TO THE USER, A 3-D MAP OF THE TWO OR MORE DATA STORES THAT IS MANIPULABLE BY THE USER, SO THE USER MAY CHOOSE WHICH DATA TO ACCESS

FIG. 5

AUTOMATIC DATA LAYERING

FIELD OF TECHNOLOGY

Aspects of the disclosure relate to providing apparatus and methods to automatically layer data to categorize and control access to the data.

BACKGROUND OF THE DISCLOSURE

Entities may include individuals, corporations, partnerships, non-profits, government agencies or branches, and other groups of people. Entities may be any size, including small (one member or employee) or large (thousands of employees or members). Entities may have an internal network. Entities may store data in one or more databases. Each database may be segmented into one or more sections or data stores.

Data stored by an entity may be restricted to various users or uses. Not all users may have the ability to access all of the data. Some data may be restricted, or should be restricted for privacy, regulatory or other purposes. For example, a machine learning model may be trained on one set of data but may not need access to other sets or types of data, so access should be restricted to only the necessary data.

There may be various methods to sort and categorize the data to restrict access, but all of these methods may require active human participation. These methods may be expensive, slow, and cumbersome.

Currently, there is no apparatus or method available to automatically layer disparate data to sort, categorize, and control access to the data.

Therefore, it would be desirable for apparatus and methods to automatically layer data to sort, categorize, and control access to the data.

SUMMARY OF THE DISCLOSURE

It is an object of this disclosure to provide apparatus and methods to automatically layer data to sort, categorize, and control access to various data.

An automatic data layering computer program product is provided. The computer program product may include executable instructions. The executable instructions may be executed by a processor on a computer system.

The instructions may receive access to two or more data stores. Each data store may include two or more quanta of data and may be located at a separate database.

The instructions may analyze each quanta of data by applying one or more artificial intelligence/machine learning ("AI/ML") algorithms.

The instructions may categorize each quanta of data with a level of access by applying one or more artificial intelligence/machine learning ("AI/ML") algorithms.

The instructions may transfer each quanta of data from one data store to another to limit each data store to data with one level of access.

The instructions may receive a request to access data from a user.

The instructions may determine the user's level of access, i.e., which data the user may access.

The instructions may authorize the user to access a data store with data that matches the user's level of access.

In an embodiment, the computer system with the product may be on a network.

In an embodiment, the executable instructions may search the network for one or more additional data stores.

In an embodiment, when the executable instructions discover one or more duplicate quanta of data on one or more data stores, the instructions may delete the one or more duplicate quanta of data.

In an embodiment, each database may be on a separate computer system.

In an embodiment, each separate computer system may be geographically distant.

In an embodiment, the executable instructions may display a graphical user interface for the user to access one or more of the data stores.

In an embodiment, the graphical user interface may display data accessible and available to the user in a three-dimensional mesh.

In an embodiment, the three-dimensional mesh may display one layer of data on an interval of the z-axis corresponding to one level of access, so that each quanta of data in the layer has the same level of access.

In an embodiment, to determine the user's level of access, the instructions may apply one or more artificial intelligence/machine learning ("AI/ML") algorithms.

In an embodiment, the user's level of access may be provided to the computer program with the request.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 5 shows an illustrative flowchart in accordance with principles of the disclosure.

DETAILED DESCRIPTION OF THE DISCLOSURE

Figure 1:
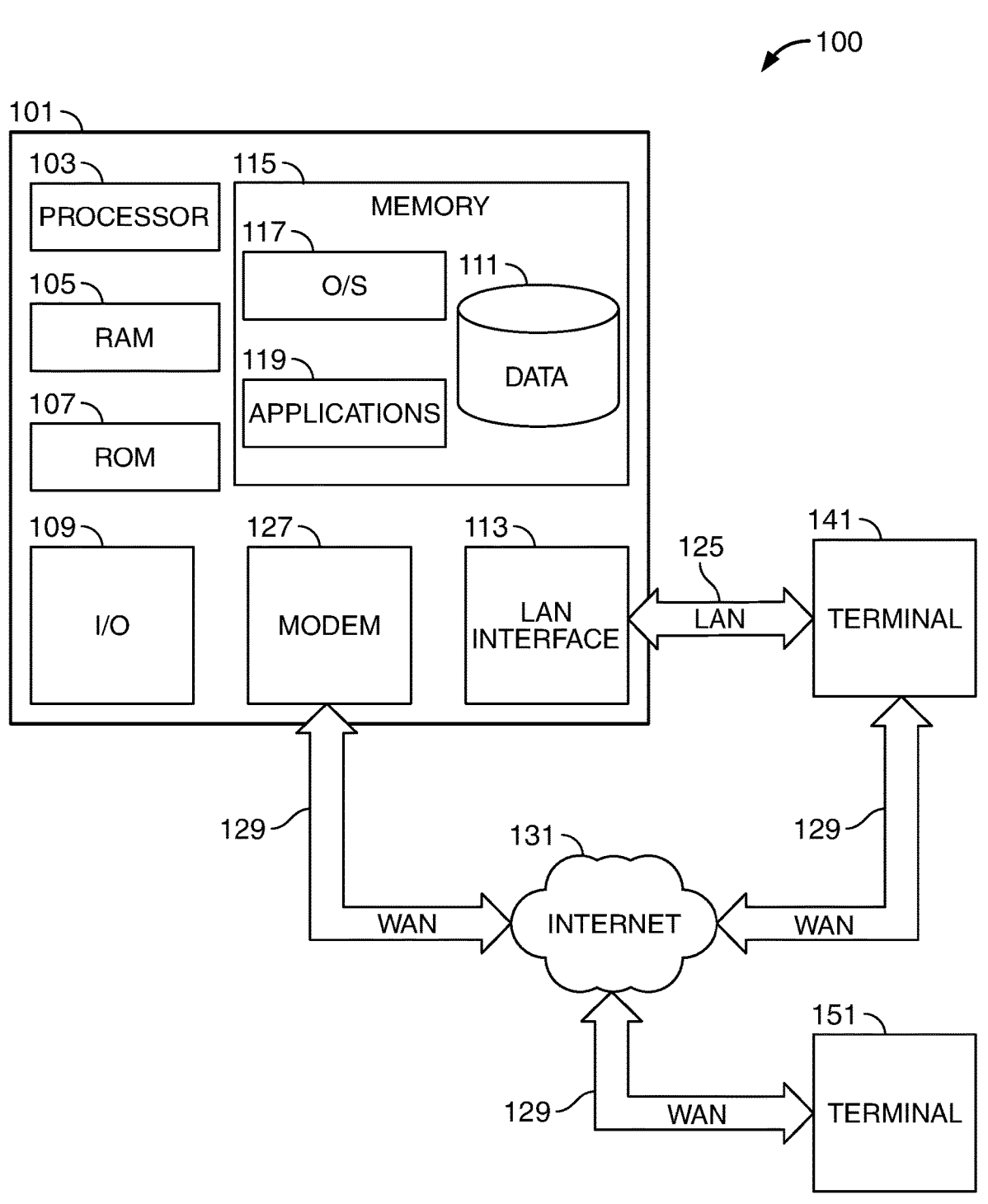
FIG. 1 shows an illustrative apparatus in accordance with principles of the disclosure.

It is an object of this disclosure to provide apparatus and methods to automatically layer various quanta of data to sort, categorize, and control access to the various data.

An automatic data layering computer program product is provided. The computer program product may include executable instructions stored on non-transitory memory of a computer system. The executable instructions may be executed by one or more processors on a computer system.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, laptop or tablet, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include, among other components, a display, a communication link, a processor or processors, and a non-transitory memory configured to store executable data configured to run on the processor. The executable data may include an operating system and the automatic data layering computer program.

A processor or processors may control the operation of the computer system and its components, which may include RAM, ROM, an input/output module, and other memory. The microprocessor(s) may also execute all software running on the apparatus and computer system. Other components commonly used for computers, such as EEPROM or Flash memory or any other suitable components, may also be part of the apparatus and computer system.

A communication link may enable communication with other computers, databases, as well as any server or servers. The communication link may include any necessary hardware (e.g., antennae) and software to control the link. Any appropriate communication link may be used, such as Wi-Fi, bluetooth, LAN, and cellular links. In an embodiment, the network used may be the Internet. In another embodiment, the network may be an internal intranet or other network.

The computer system may be a server. The computer program, or portions of the computer program may be linked to other computers or servers running the computer program. The server or servers may be centralized or distributed. Centralized servers may be more powerful and secure than distributed servers but may also be more expensive and less resilient.

The instructions may receive access to two or more data stores. Each data store may include two or more quanta of data and may be located at a separate database. Each data store may be static, in that no additional data may be added and no existing data may be deleted. Each data store may be dynamic in that additional data may be added at any time and data deleted at any time. A data store may refer to an entire database, or a portion of a database. A data store may be a computer folder, file, or other indexing or storage method. A data store may include one or more computer folders, files, or other indexing or storage method, or a combination of the above.

The access received may be granted automatically by another computer, a network, a physical medium (such as a hard drive, USB drive, CD-ROM etc.), or a person, such as a system administrator. For example, a system administrator may grant the program access to various data at various locations. Or access may be programmed into the program at any point.

Each quanta of data may be data of any type, in any format. Data may be files, programs, text, audiovisual, sets of data, or other types of data.

Each database may include multiple data stores. A data store may be a file folder or other indexing method. A data store may include one or more files. Each file may include one or more quanta of data.

Each quanta of data may be one or more bits or bytes of digital data. For example, a quanta of data may be one bit of digital data. Or a quanta of data may be an entire text document, or an entire file. A quanta of data may be referred to as a unit of data. In a specific example, a financial institution may receive 1000 mortgage applications every day. Each application may be a unit of data. Or each application may include numerous data fields (income, assets, debts, etc.), and each data field may be a unit of data.

Determining what, and how big, each quanta of data is may be a function of the program, or it may be predetermined. The definition of each quanta of data may be variable and may depend on the amount and types of data stored in each data store.

Data may be in any format. Data may be in varied formats. In an embodiment, data may be converted from one format to another.

The instructions may analyze each quanta of data by applying one or more artificial intelligence/machine learning ("AI/ML") algorithms. Any suitable AI/ML algorithms may be used. Each algorithm may dynamically evaluate one or more factors in its analysis. The algorithm(s) may iterate. The algorithm(s) may be trained on a training set of data. The training set may be created data or actual data. The algorithms may be checked by one or more system administrators.

The analysis may include evaluating metadata, time created, location created, system created, who or what created the data, data type, use of the data, existing access logs of the data, the data itself, policies, regulations, as well as other factors.

Each factor may be analyzed on a scale. The scale may be of any type. For example, the scale may be a number from 0 through 10, with 10 being a need for the most restrictive level of access and 0 being least likely to need restricted access. The scale may be adjusted dynamically by the program. The scale may be adjusted manually.

The instructions may categorize each quanta of data with a level of access by applying one or more artificial intelligence/machine learning ("AI/ML") algorithms. Any suitable AI/ML algorithms may be used. Each algorithm may dynamically evaluate one or more factors in its analysis. The algorithm(s) may iterate. The algorithm(s) may be trained on a training set of data. The training set may be created data or actual data. The algorithms may be checked by one or more system administrators.

The level of access categories may be in any suitable format. For example, data may be categorized with levels of access ranging from 1 to n, with 1 being accessible to everyone and n having the most restrictive access. Any other suitable categorization scheme may be used.

The instructions may transfer each quanta of data from one data store to another to limit each data store to data with one level of access. For example, if there are five data stores, and the data has been categorized with five levels of access, the program may transfer data between each data store so that one data store has the data with the first level of access, a second data store has the data with the second level of access, etc.

The instructions may receive a request to access data from a user. The request may be transmitted over any network or communications protocol. For example, the user may request access to mortgage application data for underwriting, data analysis or other reasons.

The instructions may determine the user's level of access, i.e., which data the user may access. Various users may have different levels of access. A user's level of access may be variable.

In an embodiment, the program may vary the user's level of access. The program may vary the user's level of access based on various factors or instructions from a system administrator.

Once the user's level of access has been determined, the instructions may authorize the user to access a data store with data that matches the user's level of access. For example, if the user's level of access is 3, the program may authorize the user to access all data stores with the access level of three.

In an embodiment, the computer system with the computer program product may be on a network. The network may be an internal network, such as an intranet, or an external network, such as the Internet.

In an embodiment, the executable instructions may search the network for one or more additional data stores that the program has not received access to. For example, if the program receives access to 100 data stores on the network, but there are 110 data stores on the network, the program may search the network for any data store it has not received access to.

In an embodiment, the instructions may automatically search a network, such as the Internet, for additional data stores. The search may be constant. The search may be at predetermined intervals, such as every week or every 30 days.

In an embodiment, the program may request access (from an administrator or elsewhere) to the additional data stores. In an embodiment, the program may grant itself access to the additional data stores.

In an embodiment, the program may detect duplicate data on one or more data stores. In an embodiment, when the executable instructions discover one or more duplicate quanta of data on one or more data stores, the instructions may delete the one or more duplicate quanta of data. Deleting duplicate data may save storage space and computing resources.

In an embodiment, each database may be on a separate computer system. That is, each data store may be on separate computer systems. Each database may include one or more data stores.

In an embodiment, each separate computer system may be geographically distant.

Each database may be located at a computer system. Each database may be located remotely from the computer system with the program. Each database may be located at or near the computer system with the computer program. Each database may be accessed over an internal or external network.

In an embodiment, each database may be distributed across multiple computer systems or servers. The distributed systems or servers may be geographically distant.

In an embodiment, each database may be encrypted. Encrypting each database may be required depending on the sensitivity of the data, the network, or the computer systems. Any appropriate encryption protocol or method may be used.

In an embodiment, the executable instructions may display on a computer display a graphical user interface for the user to access one or more of the data stores. The graphical user interface may be configured in any appropriate manner. The graphical user interface may be on a display proximate to the user. The graphical user interface may be on a touch-sensitive display.

In an embodiment, the graphical user interface may display data accessible and available to the user in a three-dimensional mesh. The mesh may be a digital representation of the location and access levels of the various data stores or quanta of data.

In other embodiments, the display may display a two-dimensional representation of the available data.

In an embodiment, the display may display a representation of all of the data analyzed and categorized by the program. In an embodiment, the display may display only a representation of the data available to the user.

In an embodiment, the three-dimensional mesh may display one layer of data on an interval of the z-axis corresponding to one level of access, so that each quanta of data in the layer has the same level of access. For example, there may be n levels of access for the data, so there may be n layers of data displayed on the mesh. Each layer may correspond to one level of access. Displaying the data in layers may immediately display to a user how much data exists at each level of access, and where each quanta of data is located.

In an embodiment, to determine the user's level of access, the instructions may apply one or more artificial intelligence/machine learning ("AI/ML") algorithms. Any suitable algorithm may be used.

In an embodiment, the user's level of access may be provided to the computer program with the request. For example, the user may state in the request that "I have access to 'x' level of data," or the equivalent.

An apparatus for a complex data mesh is provided. The apparatus may include a central server and two or more nodes.

The central server may include a server communication link, a server processor, and a server non-transitory memory. The server non-transitory memory may be configured to store at least a server operating system, and an automatic data layering application.

Each of the two or more nodes may include a node communication link, and a node non-transitory memory. Each node non-transitory memory may be configured to store at least a node operating system, and two or more quanta of data.

The automatic data layering application may receive access to each of the two or more nodes. When the automatic data layering application receives access to each of the two or more nodes, the automatic data layering application may analyze each quanta of data, categorize each quanta of data with a level of access, and generate a map. The map may include a representation of all of the data. The map may include a representation of only the data the user has access to. The map may include a link to each quanta of data, the level of access of each quanta of data, and a location of each quanta of data.

The automatic data layering application may receive a request to access data from a user. When the automatic data layering application receives a request to access data from a user, the automatic data layering application may determine the user's level of access and authorize the user to access each link on the map that corresponds to the user's level of access.

In an embodiment, the user's level of access may increase from 1 to n.

In an embodiment, when a user has an access level of n, that access level may include access to all levels between 1 and n, including 1 and n. For example, if the levels of access available range from 1 to 10 and the user has an access level of 5, the user may access data in levels 1, 2, 3, 4, and 5, not only data in level 5.

In an embodiment, the map may be three-dimensional, or displayed as a three-dimensional, topographic map.

In an embodiment, the map may be displayed by the apparatus to the user on a graphical user interface. The graphical user interface may be on the apparatus or on a device proximate to the user. The display may be touch-sensitive.

In an embodiment, the graphical user interface may display only a portion of the map that is accessible to the user. For example, if the user can access data with access levels of one through five, the map may display only representation(s) of data with those accessible access levels. All data with access levels from six to n may not be displayed on the map.

A method for automatic data layering is provided. The method may include the step of receiving, at an automatic data layering computer program product on a central server, access to two or more data stores. Each data store may include two or more quanta of data and may be located at a separate database.

The method may include the step of analyzing, by applying one or more one or more artificial intelligence/machine learning ("AI/ML") algorithms, each quanta of data.

The method may include the step of categorizing, by applying one or more artificial intelligence/machine learning ("AI/ML") algorithms, each quanta of data with a level of access.

The method may include the step of transferring each quanta of data to one of the separate data stores to limit each data store to data with one level of access.

The method may include the step of receiving, at the data layering computer program, a request to access data from a user.

The method may include the step of determining, at the data layering computer program, which level of data the user can access.

The method may include the step of authorizing the user to access a data store to match the user's level of access.

In an embodiment, the method may include the step of displaying, on a device proximate to the user, a map of the two or more data stores.

In an embodiment, the map may be three-dimensional.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media.

Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119 such as an automatic data layering program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an automatic data layering program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an automatic data layering program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an automatic data layering program and security protocols, as well as other programs. In an embodiment, one or more programs, or aspects of a program, may use one or more AI/ML algorithm(s). The various tasks may be related to analyzing and categorizing various data to layer the data according to levels of access.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
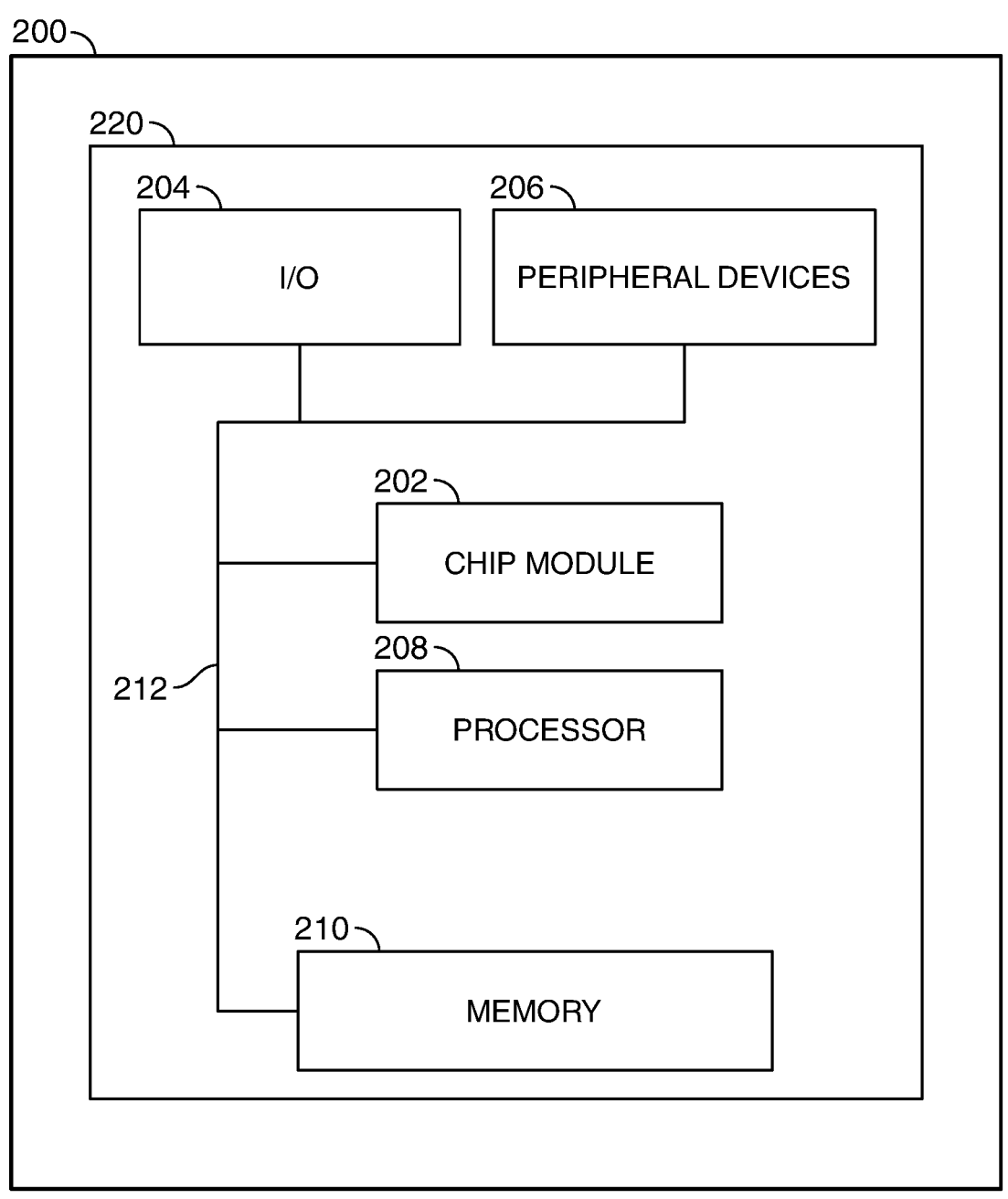
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
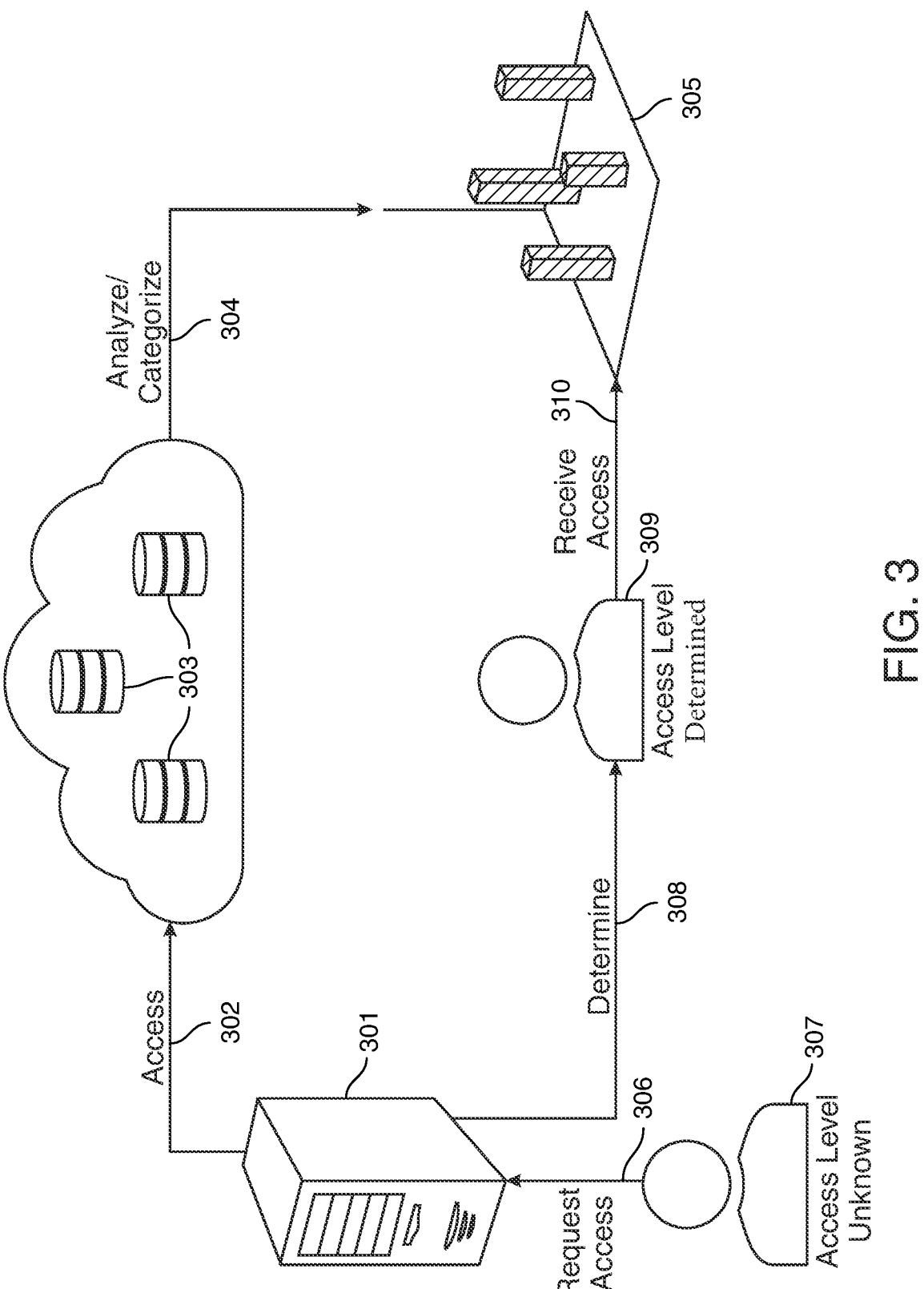
FIG. 3 shows an illustrative schematic in accordance with principles of the disclosure.

FIG. 3 shows an illustrative schematic in accordance with principles of the disclosure. Apparatus may include any of the components and systems odd-numbered 301 through 309, among other components, as well as steps even-numbered 302 through 310 on FIG. 3. Steps may be performed on the apparatus shown in FIGS. 1-4, and 6 or other apparatus shown in other figures or described elsewhere.

A computer system 301 that has an automatic data layering program installed, may receive access at step 302 to one or more data stores 303. Each data store 303 may include one or more quanta of data.

The program may analyze and categorize the data with levels of access at step 304. The program may create a 3-D map 305 of the data categorized by levels of access.

A user 307 with an unknown level of access to the data may request access to the data from the program at step 306.

At step 308, the program may determine the user's level of access 309.

At step 310, the program may provide access to the data through map 305 to the user 309.

Figure 4:
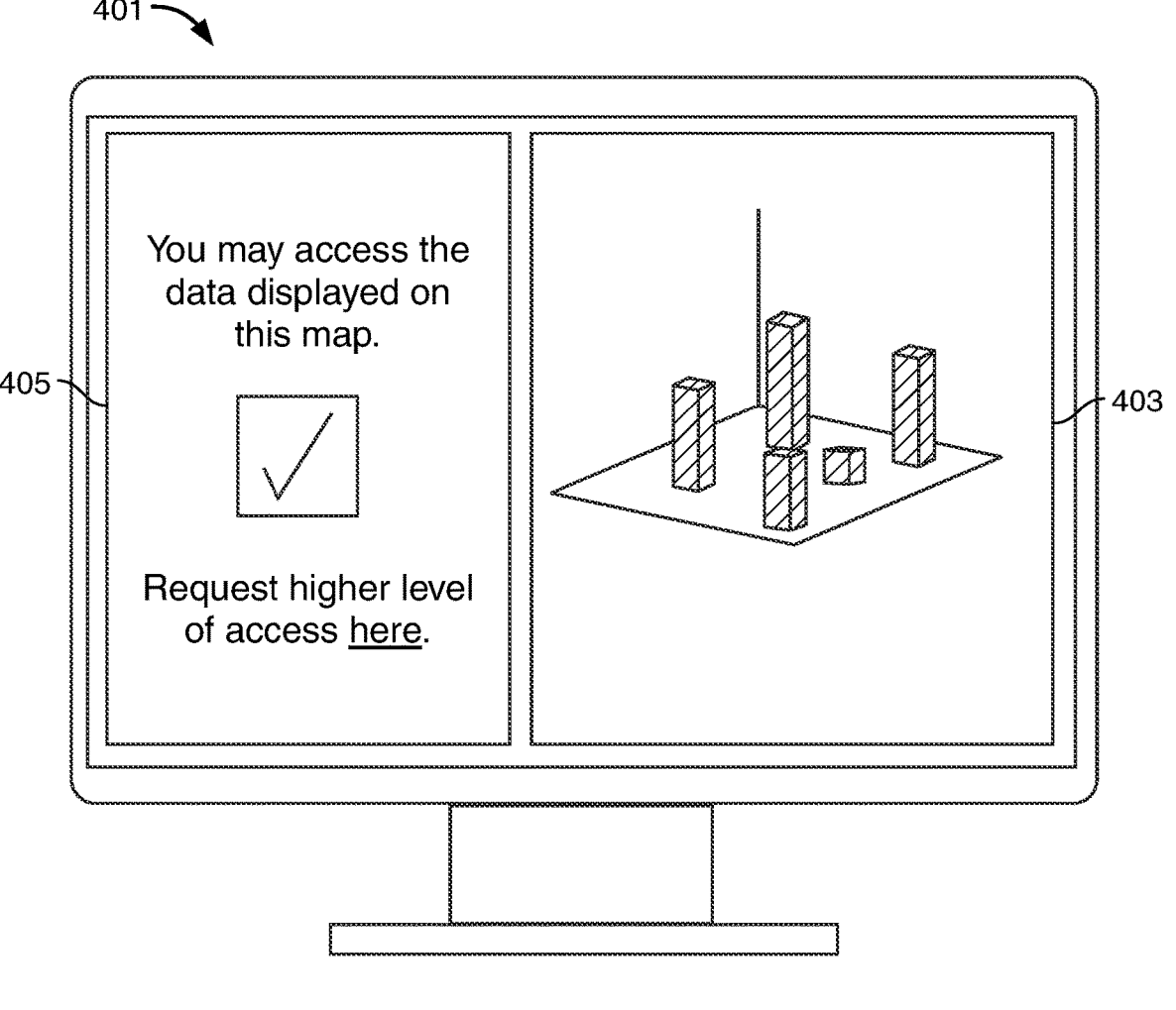
FIG. 4 shows an illustrative display in accordance with principles of the disclosure.

FIG. 4 shows an illustrative display in accordance with principles of the disclosure. Apparatus may include any of the components and systems odd-numbered 401 through 405, among other components.

A computer display 401 may include a graphical user interface. The graphical user interface may include a 3-D topographical map 403 or other map/mesh of data categorized by levels of access.

The graphical user interface may also include other information 405, including an ability for a user to request higher levels of access.

FIG. 5 shows an illustrative flowchart in accordance with principles of the disclosure. Methods may include some or all of the method steps numbered 502 through 516. Methods may include the steps illustrated in FIG. 5 in an order different from the illustrated order. The illustrative method shown in FIG. 5 may include one or more steps performed in other figures or described herein. Steps 502 through 516 may be performed on the apparatus shown in FIGS. 1-4, 6 or other apparatus.

At step 502, an automatic data layering computer program product, which may be located at a centralized or decentralized server, or other computer system, may receive access to two or more data stores. Each data store may include various quanta of data. Each data store may be located at a separate database.

At step 504, the program may analyze the data in each data store. The program may apply one or more AI/ML algorithms. The program may analyze the data to determine an appropriate level of access for each quanta of data. Some data may require higher or lower levels of access than other data.

At step 506, the program may categorize each quanta of data with a level of access for that quanta of data. The program may apply one or more AI/ML algorithms to categorize the data.

At step 508, the program may transfer data between each data store so that each data store may include only data with the same level of access. For example, one data store may include data with access level 2, and another may include data with access level 3, etc.

At step 510, the program may receive a request from a user to access various data.

At step 512, the program may determine the user's allowed level of access, i.e., which level of data the user may access.

At step 514, the program may authorize the user to access the data corresponding to the user's level of access.

At step 516, the program may display, on a display near the user, a topographical map of the data the user has access to. The map may be three-dimensional. The map may include links or other manipulable buttons so the user may access the desired data by clicking or manipulating the map.

Figure 6:
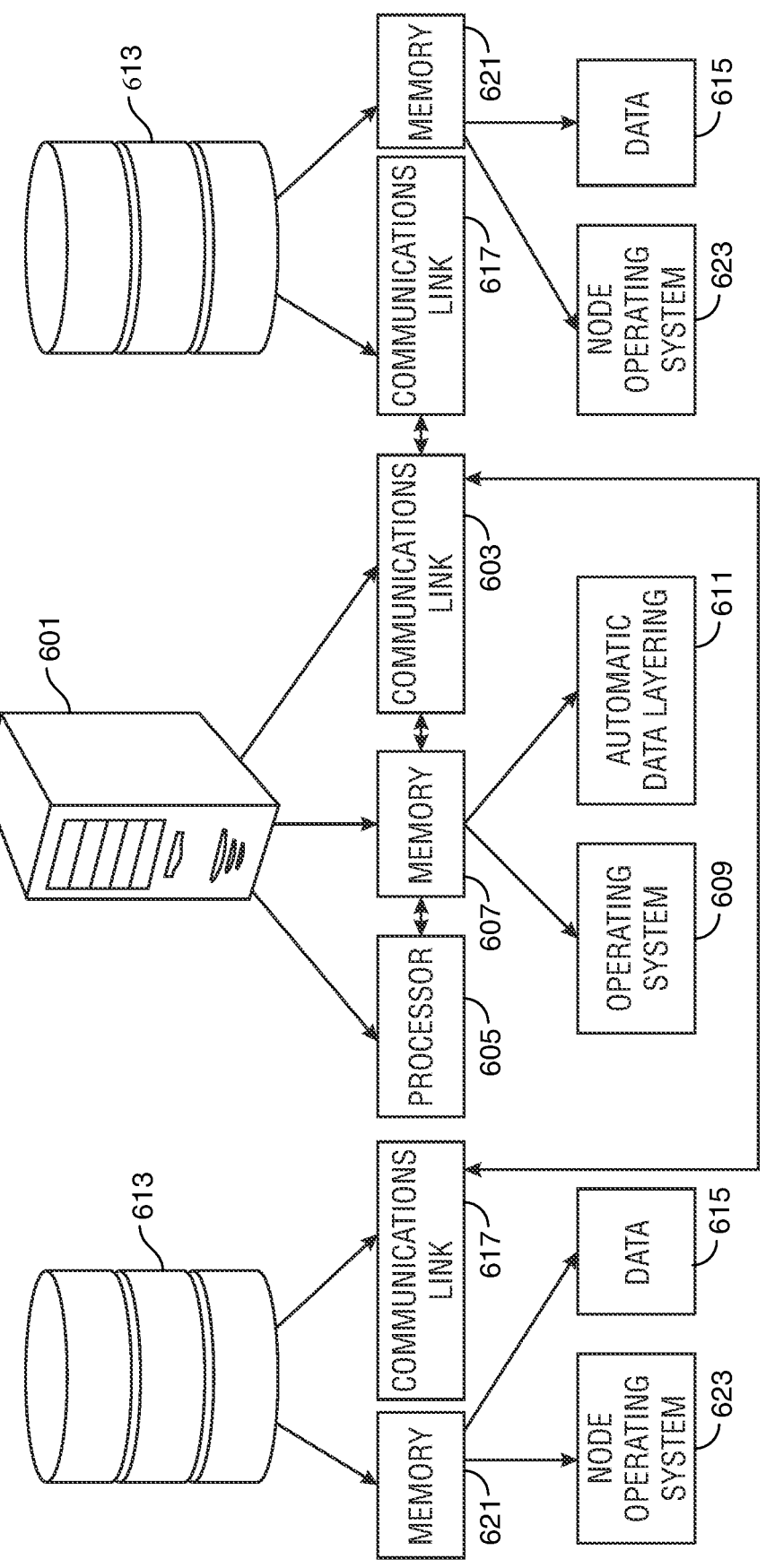
FIG. 6 shows an illustrative apparatus in accordance with principles of the disclosure.

FIG. 6 shows an illustrative apparatus in accordance with principles of the disclosure. The apparatus may include a central server 601 and two or more nodes 613.

The central server 601 may include a server communications link 603, a server processor/processors 605, and a server non-transitory memory 607, as well as other components.

Node 613 613 may include a node communications link 617, a node processor or processors, and a node non-transitory memory 621.

The server non-transitory memory 607 may include a server operating system 609, an automatic data layering application 611, as well as other data and programs.

The server communications link 603 may communicate with each node 613 (as well as other servers/computers, not shown) through node communications link 617. The automatic data layering program 611 may communicate with all nodes 613 through the server communications link 603.

The node non-transitory memory 621 may include a node operating system 623, and data 615. Data 615 may be in a data store. Data stores may be in a database. Data 615 may include two or more quanta of data.

When the automatic data layering application 611 receives access to each of the two or more nodes 613, the automatic data layering application may analyze each quanta of data 615, categorize each quanta of data 615 with a level of access, and generate a map.

The map may include a link to each quanta of data 615, the level of access of each quanta of data 615, and a location of each quanta of data.

When the automatic data layering application 611 receives a request to access data from a user, the automatic data layering application 611 may determine the user's level of access and authorize the user to access each link on the map that matches the user's level of access.

Thus, apparatus and methods to automatically layer data to categorize and control access to the data are provided. Persons skilled in the art will appreciate that the present invention can be practiced by other than the described embodiments, which are presented for purposes of illustration rather than of limitation.

What is claimed is:

1. An automatic data layering computer program product, the computer program product comprising executable instructions stored on non-transitory memory of a computer system, the executable instructions when executed by a processor on the computer system:

receive access to two or more data stores, wherein each data store:

includes two or more quanta of data; and is located at a separate database;

analyze each quanta of data;

categorize each quanta of data with a level of access;

transfer each quanta of data to limit each data store to one level of access;

receive a request to access data from a user;

determine the user's level of access; and authorize the user to access a data store to match the user's level of access;

wherein:

the analysis and categorization apply one or more artificial intelligence/machine learning ("AI/ML") algorithms.

2. The automatic data layering computer program product of claim 1 wherein the computer system is on a network.

3. The automatic data layering computer program product of claim 2 wherein the executable instructions further search the network for one or more additional data stores.

4. The automatic data layering computer program product of claim 1 wherein when the executable instructions discover one or more duplicate quanta of data, the instructions further delete the one or more duplicate quanta of data.

5. The automatic data layering computer program product of claim 1 wherein each database is on a separate computer system.

6. The automatic data layering computer program product of claim 1 wherein the executable instructions display a graphical user interface for the user to access a data store.

7. The automatic data layering computer program product of claim 6 wherein the graphical user interface displays available data in a three-dimensional mesh.

8. The automatic data layering computer program product of claim 7 wherein the three-dimensional mesh displays one layer of data on a z-axis corresponding to one level of access, wherein each quanta of data in the layer has the same level of access.

9. Automatic data layering computer program product of claim 1 wherein the determination of the user's level of access applies one or more artificial intelligence/machine learning ("AI/ML") algorithms.

10. The automatic data layering computer program product of claim 1 wherein the user's level of access is provided to the computer program product with the request.

11. An apparatus for a complex data mesh, the apparatus comprising:

a central server, the central server including:

a server communication link;

a server processor; and a server non-transitory memory configured to store at least:

a server operating system; and an automatic data layering application; and two or more nodes, each node comprising:

a node communication link; and a node non-transitory memory configured to store at least:

a node operating system; and two or more quanta of data;

wherein when the automatic data layering application receives access to each of the two or more nodes, the automatic data layering application:

analyzes each quanta of data;

categorizes each quanta of data with a level of access; and generates a map, wherein the map includes:

a link to each quanta of data;

the level of access of each quanta of data; and a location of each quanta of data; and when the automatic data layering application receives a request to access data from a user, the automatic data layering application:

determines the user's level of access; and authorizes the user to access each link on the map that matches the user's level of access.

12. The apparatus of claim 11 wherein the user's level of access increases from 1 to n.

13. The apparatus of claim 12 wherein a user access level of n includes access to all levels between 1 and n, including 1 and n.

14. The apparatus of claim 11 wherein the map is three-dimensional.

15. The apparatus of claim 11 wherein the map is displayed by the apparatus to the user on a graphical user interface.

16. The apparatus of claim 15 wherein the graphical user interface displays only a portion of the map that is accessible to the user.

17. A method for automatic data layering, the method comprising the steps of:

receiving, at an automatic data layering computer program product on a central server, access to two or more data stores, wherein each data store:

includes two or more quanta of data; and is located at a separate database;

analyzing, by applying one or more one or more artificial intelligence/machine learning ("AI/ML") algorithms, each quanta of data;

categorizing, by applying one or more artificial intelligence/machine learning ("AI/ML") algorithms, each quanta of data with a level of access;

transferring each quanta of data to limit each data store to one level of access;

receiving, at the data layering computer program, a request to access data from a user;

determining, at the data layering computer program, the user's level of access; and authorizing the user to access a data store to match the user's level of access.

18. The method of claim 17, further comprising the step of displaying a map of the two or more data stores.

19. The method of claim 18, wherein the map is three-dimensional.

\* \* \* \* \*